United States Patent
Alberth

(10) Patent No.: US 8,766,593 B2
(45) Date of Patent: Jul. 1, 2014

(54) ELECTRONIC DEVICE AND METHOD WITH ROLLABLE DISPLAY

(75) Inventor: William P. Alberth, Prairie Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 441 days.

(21) Appl. No.: 13/305,035

(22) Filed: Nov. 28, 2011

(65) Prior Publication Data

US 2013/0134929 A1 May 30, 2013

(51) Int. Cl.
*H01M 10/44* (2006.01)
*H01M 10/46* (2006.01)
*H02J 7/02* (2006.01)

(52) U.S. Cl.
CPC ........................................ *H02J 7/025* (2013.01)
USPC ........................................................ 320/108

(58) Field of Classification Search
CPC ......... G09G 5/00; G09G 5/34; H02J 7/00042; H02J 7/0044; H02J 7/02; H02J 7/025
USPC .......... 320/101, 107, 108, 114, 115; 345/108, 345/110, 111, 925
See application file for complete search history.

(56) References Cited

U.S. PATENT DOCUMENTS

| | | | |
|---|---|---|---|
| 6,940,497 B2 * | 9/2005 | Vincent et al. | 345/204 |
| 7,161,590 B2 | 1/2007 | Daniels | |
| 7,786,951 B2 * | 8/2010 | Huitema et al. | 345/1.2 |
| 2008/0247126 A1 | 10/2008 | Otsuka et al. | |
| 2010/0311489 A1 | 12/2010 | Miller et al. | |
| 2011/0309772 A1 | 12/2011 | Forgey | |

* cited by examiner

*Primary Examiner* — Edward Tso
(74) *Attorney, Agent, or Firm* — Gary J. Cunningham

(57) ABSTRACT

An electronic device (200) and method (300) with rollable display is disclosed. The method (300) can include: providing (310) a rollable housing and a controller configured to control the operations of an electronic device, the rollable housing including a rolled position (402) and an unrolled position (212); locating (320) a conductive pattern in proximity to an edge portion of the rollable housing; and enabling (330) a wireless transaction when the rolled housing is scrolled in a rolled position. Advantageously, when in the rolled position (402), the device can be easily placed in proximity to a pad, for simple battery charging and/or data transfer.

20 Claims, 4 Drawing Sheets

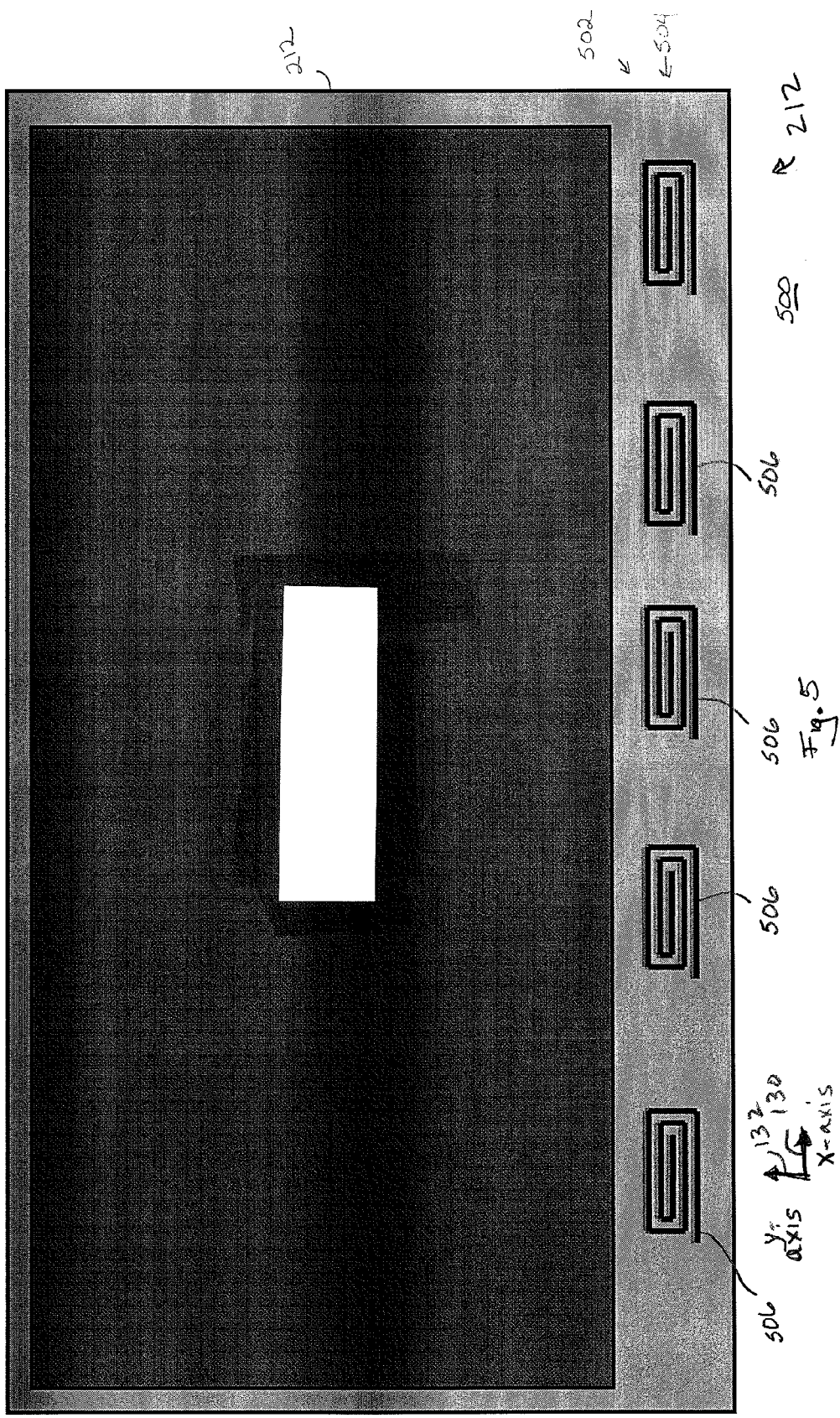

ELECTRONIC DEVICE AND METHOD WITH ROLLABLE DISPLAY

BACKGROUND

1. Field

The present disclosure relates to a method and device with a rollable display.

2. Introduction

A rollable display is a flexible display device which can be rolled up into a scroll. Technologies involved in building a rollable display include electronic ink, Gyricon, and OLED.

Electronic paper displays which can be rolled up have been developed by E Ink. E Ink refers to it as electrophoretic technology. At the Consumer Electronics Show (CES) in 2006, Philips showed a rollable display prototype. Philips represented that the screen could retain an image for several months without electricity.

Some rollable displays use flexible Organic LED display technology. There is a major interest and desire to commercialize rollable displays, for many use cases, such as in gaming, the enterprise, tablets, electronic devices, wristwatches and the like.

As background, many electronic devices, such as wireless communication devices, displays, smart phones and tablets, can barely get through a day on a single charge with normal use. With high use, or if the user cannot charge a wireless communication device at the end of the day, then a user will be left with a dead battery (or energy storage device, these terms used interchangeably), resulting in a non-operational devices.

There is a need for electronic methods and devices with a rollable device, that can be configured to be easily charged, so that a device can maintain its usefulness to a user.

It would be considered an improvement in the art, if an electronic device with an enhanced rollable display were developed.

Thus, an electronic method and device with a rollable display that addresses many of these needs, would be considered an improvement in the art.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIG. 5 is an exemplary electronic device 500 with a rollable housing 210, shown in an unrolled position 212 with a conductive pattern 502 with a plurality of lines 504 in the form of a plurality of secondary coils 506 according to one embodiment.

DETAILED DESCRIPTION

Figure 1:
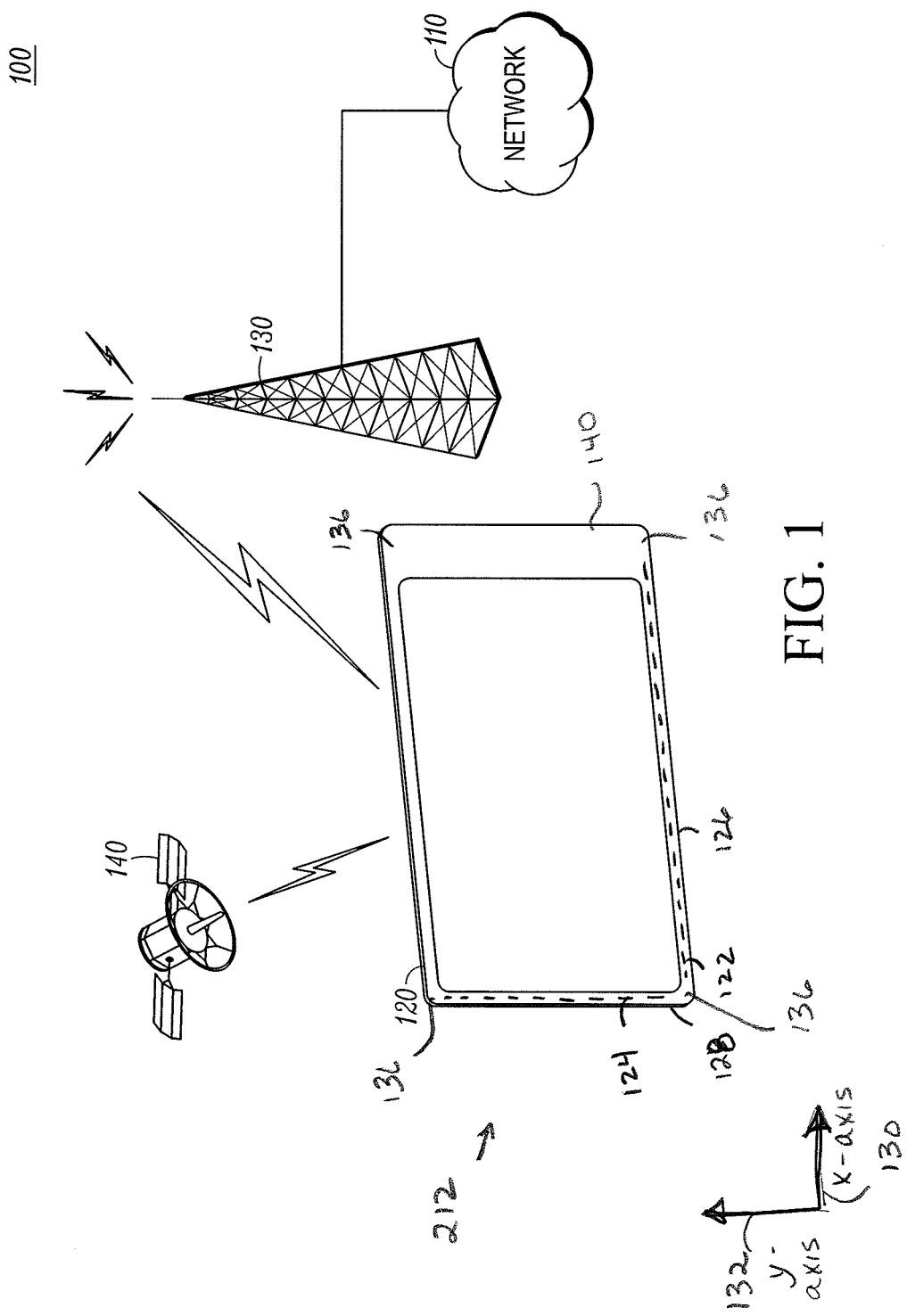
FIG. 1 is an exemplary block diagram of a communication system with an electronic device 120, according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a tablet, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 (also referred to as electronic device 120) can communicate with the network 110 and with other devices on the network 110 by sending and receiving wireless signals via the base station 130, which may also comprise local area, and/or personal area access points. The terminal 120 is shown being in communication with a global positioning system (GPS) 140 satellite, global navigation satellite system (GNSS) or the like, for position sensing and determination.

Figure 2:
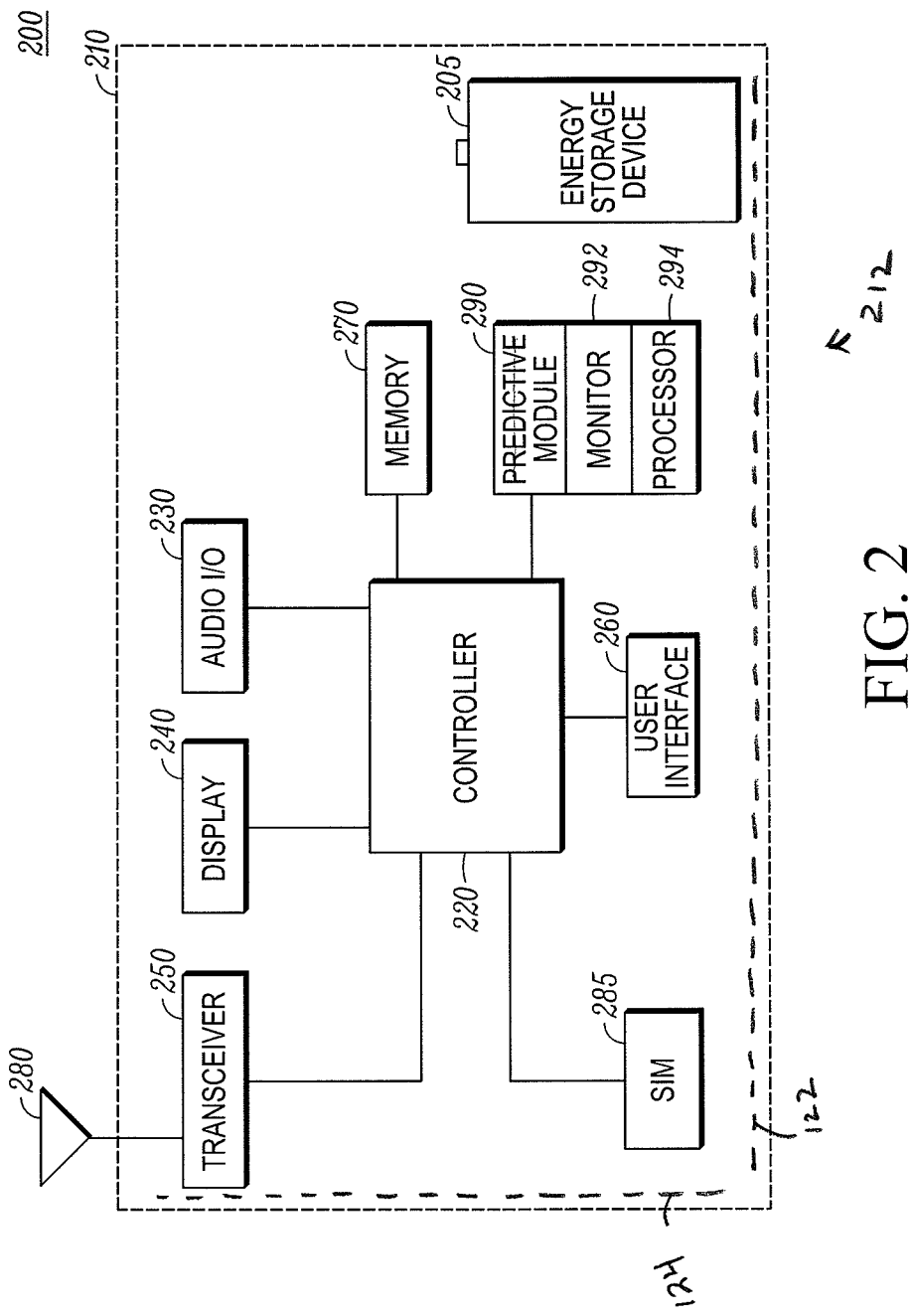
FIG. 2 is an exemplary block diagram of an electronic device with a rollable housing according to one embodiment.

FIG. 2 is an exemplary block diagram of an electronic device or wireless communication device 200, configured with an energy storage device, battery or module 205, such as in the terminal 120, for example. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220.

As shown in FIG. 2, the wireless communication device 200 further includes a power module 290 configured to manage and operate certain power and data exchange functions, as detailed below. The power module 290 can include a monitor 292 and processor 294, also as described in more detail below.

In one embodiment, the module 290 can reside within in the controller 220, can reside within the memory 270, can be an autonomous module, can be software, can be implemented in hardware, or can be in any other format useful for a module on a wireless communication device 200.

The display 240 can be a liquid crystal display (LCD), a light emitting diode (LED) display, a plasma display, a touch screen display or any other means for displaying information. In one embodiment, the display 240 is a flexible display which can be rolled up into a scroll in the rollable housing 210. The display technology can include flexible Organic LED display technology, electronic ink, Gyricon, and OLED electrophoretic technology, as should be understood by those skilled in the art.

The transceiver 250 may include a transmitter and/or a receiver. The audio input and output circuitry 230 can include a microphone, a speaker, a transducer, or any other audio input and output circuitry. The user interface 260 can include a keypad, buttons, a touch screen or pad, a joystick, an additional display, or any other device useful for providing an interface between a user and an electronic device. The memory 270 may include a random access memory, a read only memory, an optical memory or any other memory that can be coupled to a wireless communication device.

In more detail, the device 200 shown in FIG. 2, can include: a housing 210; a controller 220 coupled to the housing 210, the controller 220 configured to control the operations of the device, and to provide ancillary computing operations which may be unrelated to wireless communications such as audio or video processing, application processing and the like.

Figure 3:
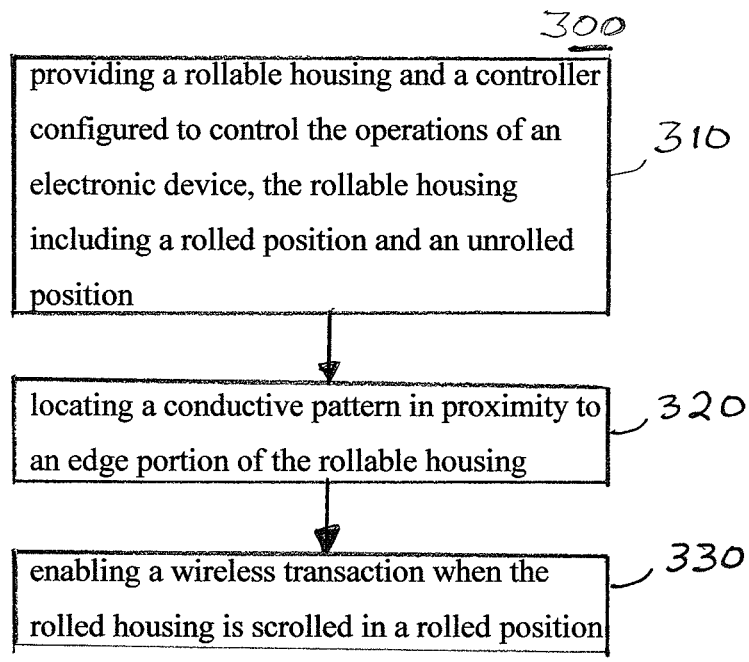
FIG. 3 is an exemplary block diagram of a method with a rollable housing according to one embodiment.

A block diagram of an electronic method with rollable display, is shown in FIG. 3. In its simplest form, the method 300 can include: providing 310 a rollable housing and a controller configured to control the operations of an electronic device, the rollable housing including a rolled position and an unrolled position; locating 320 a conductive pattern in proximity to an edge portion of the rollable housing; and enabling 330 a wireless transaction when the rolled housing is scrolled in a rolled position.

Figure 4:
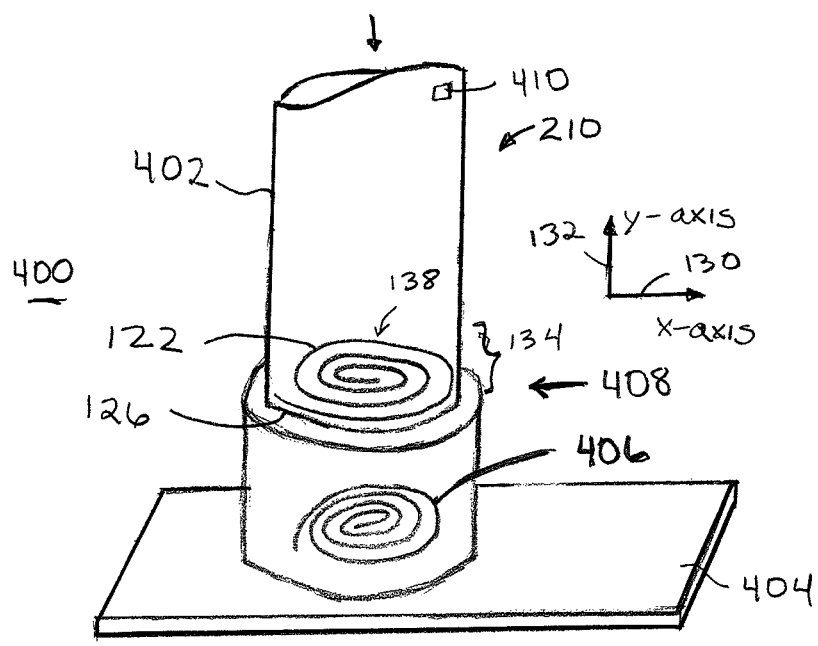
FIG. 4 is an environmental view 400 of an exemplary electronic device with rollable housing, shown in a rolled position 402 with a cradle pad 404 below, being placed on or near the cradle pad 404, as shown by an arrow in FIG. 4, according to one embodiment.

Advantageously, when in the rolled position, the device can be easily placed in proximity to a wireless primary of a cradle pad, via an inductive coupling, for simple battery charging and/or data transfer, as detailed herein. The method 300 simplifies the recharging of batteries or energy storage devices when in the rolled position, which users will welcome. The method 300 also can simplify data exchange when in the rolled position. Beneficially, a power module can be used, to provide personalized and reliable power management and data exchange, as detailed below. As shown in FIG. 4, when the rolled housing is in the rolled position, the conductive pattern provides a conductive line of concentric circles, to create an inductor. This construction can provide a coil, for charging and/or data exchange.

As shown in FIG. 4, when the rolled housing is in the rolled position, the conductive pattern provides a conductive line of concentric circles, to create an inductor configured to provide connectivity for a wireless charging function or a wireless data exchange with a cradle pad, as detailed below.

As illustrated in FIGS. 1-3, the providing step 310 can include providing a display viewable in an unrolled position, as shown in FIG. 1. For example, the device can be easily unrolled for normal operation.

As shown in FIGS. 2 and 3, the method 300 can further include providing a power module 290 with a program that is loadable, upgradeable and customizable. This allows a user to enhance his or her device, as desired, by for example, downloading a software program, adjusting a setting and inputting information in a profile, for example. Advantageously, in one use case, a user can load an application through a USB connection, for example, or download a program to load on the device 210. Similarly, upgrades and customizations can be loaded in any customary way. In one embodiment, the method 300 can include monitoring user activity via monitor 292, and warning a user when a certain threshold activity has been met, that the remaining battery capacity is low. Advantageously, a user can then take appropriate measures, such as immediately recharging or replacing a battery, and the like. In one embodiment, the processor 294 can include a program that can help to enhance power and data exchange operations, for example.

As shown in FIG. 4, the method 300 can further include configuring the rollable housing with an indicator 410 for alerting a user that at least one of a wireless transaction has successfully occurred, is in the process of occurring and has not successfully occurred. For example, one indicator could indicate green when a wireless transaction has successfully occurred, yellow when a wireless transaction is occurring and red when a wireless transaction has not occurred. As should be understood, many similar indicators can be used.

An exemplary electronic device with rollable display, is shown in FIGS. 1, 2, 4 and 5. In its simplest form, the electronic device 120, includes: a rollable housing 210, the rollable housing 210 including a display 240 and at least one first conductive pattern 122 in proximity to an edge portion 126 along an x-axis 130 and second conductive pattern 124 in proximity to an edge portion 128 along a y-axis 132; a controller 220 coupled to the rollable housing 210, the controller 220 configured to control the operations of an electronic device 120; and the rollable housing 210 including a rolled position 402 in FIG. 4 and an unrolled position 212 in FIGS. 1 and 2, the rolled position 402 including the conductive pattern 122 defining an inductive module 134 configured to enable a wireless transaction and the unrolled position 212 configured to allow viewing of the display.

Advantageously, in a rolled up or scrolled position 402, it can be easily charged at a charging station 404, for example. Also, data can be exchanged at the station 404, such as usage information, time stamping, battery life remaining and the like.

The device 120 has many use cases, including but not limited to: consumer use in gaming, newspapers, ebooks, electronic poster boards and the like; use in wireless communication devices, such as cell phones and tablets such as a Zoom by Motorola and an ipad by Apple; and enterprise use for technical drawings, such as schematics, mechanical and architectural drawings, service industry and the like.

In a preferred embodiment as illustrated in FIG. 4, when the rollable housing 210 is in the rolled position 402 the device 210 is configured to provide wireless connectivity, such that it can be wirelessly coupled to a cradle pad 404, for charging or data exchange. In more detail, the cradle pad 404 can include a wireless charging primary coil 406, the wireless charging primary coil 406 being located in proximity to the inductive module 134.

In one embodiment, the conductive pattern includes an inductor located in proximity to at least one of an edge portion 122 or 124 and a corner portion of the rollable housing, for simplified connection to a cradle pad 404.

As illustrated in FIG. 4, when the rollable housing 210 is in the rolled position 402, the conductive pattern 122 forms an inductor 138 configured to enable wireless connectivity, for example, when placed on or near a wireless charging primary coil 406 of a cradle pad 404. In one use case, the conductive pattern 122 can include a sensor that can sense the location of device 120 in proximity to a primary coil, and trigger a transaction, such as a recharge or data transfer.

As shown in the figures, the conductive pattern 122 can include a plurality of lines printed on or in the rollable housing 210. This structure can provide a wireless charging secondary coil 408. In use, the primary coil 406 could charge the secondary coil 408, when charging a battery. Also, digital data can be exchanged either way via coils 406 and 408.

Referring to FIG. 5, an exemplary electronic device 500 with a rollable housing 210, shown in an unrolled position 212 with a conductive pattern 502 with a plurality of lines 504 in the form of a plurality of secondary coils 506, is shown. The electronic device 500 can include a plurality of lines 504 printed on or in the rollable housing 210 comprising a plurality of wireless secondary coils 506, wherein the controller 220 sequentially checks each of the plurality of wireless secondary coils 506 for the presence of a wireless primary coil 406 (in FIG. 4), and if the wireless primary coil 406 is found chooses at least one of the plurality of wireless secondary coils 506 with which to power the device and/or to exchange data with.

The wireless transaction herein can include charging a battery. It can also include data transfer.

In FIG. 1, the conductive pattern 122 includes a line in or printed on a side 140 of the rollable housing 212, the line including at least part of the inductive module 134, such that an inductive coupling can be made when in the rolled position 402 (FIG. 4). In one embodiment, the line is covered, by paint, a structure and the like for decorating or covering the line, which is conductive.

In one embodiment as shown in FIG. 4, the rollable housing 212 can include an indicator 410 configured to alert a user that at least one of a wireless transaction has successfully occurred indicating green, is in the process of occurring indicating yellow and has not successfully occurred indicating red. As should be understood, other indicators could be used. The indicator may be a pixel among a number of pixels of the display.

The device 120 and 200 and method 300 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure. In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. An electronic device, comprising:
   a rollable housing, the rollable housing including a display and a conductive pattern in proximity to an edge portion;
   a controller coupled to the rollable housing, the controller configured to control the operations of an electronic device; and
   the rollable housing including a rolled position and an unrolled position, the rolled position including the conductive pattern defining an inductive module configured to enable a wireless transaction and the unrolled position configured to allow viewing of the display.

2. The electronic device of claim 1, wherein when the rollable housing is in the rolled position it is configured to provide wireless connectivity.

3. The electronic device of claim 1, wherein when the rollable housing is in the rolled position it is configured to be wirelessly coupled to a cradle pad including a wireless charging primary, the wireless charging primary being located in proximity to the inductive module.

4. The electronic device of claim 1, wherein the conductive pattern includes an inductor located in proximity to at least one of an edge portion and a corner portion of the rollable housing.

5. The electronic device of claim 1, wherein when the rollable housing is in the rolled position, the conductive pattern forms an inductor configured to enable wireless connectivity.

6. The electronic device of claim 1, wherein the conductive pattern includes a plurality of lines printed on or in the rollable housing.

7. The electronic device of claim 1, wherein the conductive pattern includes a plurality of lines printed on or in the rollable housing comprising a wireless charging secondary.

8. The electronic device of claim 1, wherein the conductive pattern includes a plurality of lines printed on or in the rollable housing comprising a plurality of wireless charging secondary coils, wherein the controller sequentially checks each of the plurality of wireless charging secondary coils for the presence of a wireless charging primary coil, and if the wireless charging primary coil is found chooses at least one of the plurality of wireless charging secondary coils with which to power the device.

9. The electronic device of claim 1, wherein the wireless transaction includes at least one of charging and data transfer.

10. The electronic device of claim 1, wherein the conductive pattern includes a line in or printed on a side of the rollable housing, the line including at least part of the inductor module.

11. The electronic device of claim 1, wherein the conductive pattern includes a line printed on a side of the rollable housing, the line being covered.

12. The electronic device of claim 1, wherein the rollable housing includes an indicator configured to alert a user that at least one of a wireless transaction has successfully occurred, is in the process of occurring and has not successfully occurred.

13. The electronic device of claim 1 further comprising a power module configured with a program that is loadable, updatable and customizable by a user.

14. An electronic method, comprising:

providing a rollable housing and a controller configured to control the operations of an electronic device, the rollable housing including a rolled position and an unrolled position;

locating a conductive pattern in proximity to an edge portion of the rollable housing; and enabling a wireless transaction when the rolled housing is scrolled up in a rolled position.

15. The method of claim 14, wherein when the rolled housing is in the rolled position, the conductive pattern provides a conductive line of concentric circles, to create an inductor.

16. The method of claim 14, wherein when the rolled housing is in the rolled position, the conductive pattern provides a conductive line of concentric circles, to create an inductor configured to provide connectivity for a wireless charging function or a wireless data exchange with a cradle pad.

17. The method of claim 14, wherein the providing step includes providing a display viewable in an unrolled position.

18. The method of claim 14 further comprising providing a power module with a program that is loadable, upgradeable and customizable.

19. The method of claim 14 further comprising configuring the rollable housing with an indicator for alerting a user that at least one of a wireless transaction has successfully occurred, is in the process of occurring and has not successfully occurred.

20. The method of claim 14 further comprising sensing via a portion of the conductive pattern a location of a device in proximity to a primary coil, and triggering a transaction including at least one of a recharge or data transfer.

* * * * *